(12) United States Patent
Leta et al.

(10) Patent No.: US 6,475,374 B1
(45) Date of Patent: Nov. 5, 2002

(54) PRODUCTION OF LUBRICATING OILS BY A COMBINATION CATALYST SYSTEM

(75) Inventors: Daniel Paul Leta, Flemington; Stuart Leon Soled, Pittstown; Gary Brice McVicker, Califon, all of NJ (US); Sylvain Hantzer, Prairieville, LA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 09/601,847

(22) PCT Filed: Feb. 12, 1999

(86) PCT No.: PCT/US99/03009
§ 371 (c)(1),
(2), (4) Date: Sep. 15, 2000

(87) PCT Pub. No.: WO99/41336
PCT Pub. Date: Aug. 19, 1999

Related U.S. Application Data

(60) Provisional application No. 60/074,650, filed on Feb. 13, 1998.

(51) Int. Cl.[7] .................. C10G 61/02; C10G 63/02; C10G 64/02; C10G 35/06
(52) U.S. Cl. .................. 208/62; 208/28; 208/79; 208/134; 208/135
(58) Field of Search .................. 208/28, 62, 79, 208/234, 235

(56) References Cited

U.S. PATENT DOCUMENTS

| | | | |
|---|---|---|---|
| 4,743,355 A | 5/1988 | Ward | 208/59 |
| 4,908,120 A | 3/1990 | Bowes et al. | 208/59 |
| 4,919,788 A | 4/1990 | Chen et al. | 208/59 |
| 5,037,528 A | 8/1991 | Gardwood et al. | 208/27 |
| 5,135,638 A | 8/1992 | Miller | 208/27 |
| 5,246,566 A | 9/1993 | Miller | 208/27 |
| 5,378,351 A | 1/1995 | Guichard et al. | 208/143 |
| 5,723,716 A | 3/1998 | Brandes et al. | 585/734 |
| 5,834,522 A | 11/1998 | Mignard et al. | 518/700 |
| 5,885,438 A | 3/1999 | Apelian et al. | 308/27 |

Primary Examiner—Thuan D. Dang
(74) Attorney, Agent, or Firm—James H. Takemoto; Linda M. Scuorzo; Gerard J. Hughes

(57) ABSTRACT

A process for preparing a lubricating oil basestock having good low temperature properties. The process includes a first amorphous isomerization catalyst having a pore volume less than 0.99 ml/gm ($H_2O$), an alumina content in the range of 30–50 wt % based on isomerization catalyst and an isoelectric point in the range of 4.5 to 6.5. The isomerization step is followed by a catalytic dewaxing step using an intermediate pore crystalline molecular sieve.

12 Claims, 9 Drawing Sheets

PRODUCTION OF LUBRICATING OILS BY A COMBINATION CATALYST SYSTEM

This application claims benefit of provisional application No. 60/074,650 filed Feb. 13, 1998.

BACKGROUND OF THE INVENTION

1. Field of the Invention

This invention relates to a process for preparing lubricating oil basestocks. More particularly, a hydrocarbon feedstock is dewaxed by contacting the feedstock with an amorphous isomerization catalyst followed by a crystalline molecular sieve dewaxing catalyst.

2. Background of the Disclosure

In order to achieve the low temperature properties required for modern lubricating oil basestocks, it is usually necessary to dewax lubricating base oil feeds to remove waxy paraffins. It is well known that removal of waxy paraffins is needed to produce a base oil having the low pour points needed for acceptable cold flow properties.

Conventional methods for dewaxing include solvent dewaxing and catalytic dewaxing. It is difficult to economically produce a base oil which meets the low temperature properties required by present and future standards for engine oils. i.e., a high viscosity index (VI) and low pour point, from a conventional crude feedstock by solvent dewaxing alone, particularly as the VI and pour point demands are made increasingly stringent. Alternatives to solvent dewaxing include catalytic dewaxing by selective hydrocracking and/or catalytic dewaxing by wax isomerization. Both alternatives typically employ shape selective crystalline molecular sieves.

U.S. Pat. No. 5,149,421 discloses a process for catalytically dewaxing a hydrocarbon feed by contacting the feed in the presence of hydrogen with a layered catalyst containing an intermediate pore size silicoaluminophosphate molecular sieve and a hydrogenation component, and an intermediate pore size aluminosilicate zeolite.

U.S. Pat. No. 4,919,788 describes a process for producing a lubricating oil basestock with a target pour point and high VI by dewaxing a feed with a catalyst containing at least one large pore zeolite having a hydrogenation-dehydrogenation component to isomerize waxy paraffinic components and selectively dewaxing the effluent by preferential removal of straight chain, waxy components. The selective dewaxing component can be solvent or selective cat dewaxing. Selective cat dewaxing can be accomplished by a zeolite such as ZSM-22 or ZSM-23.

EP 188,898 B1 relates to a process for dewaxing a feedstock by contacting the feed with a crystalline zeolites having a Constraint Index less than 2 associated with a hydrogenation/dehydrogenation component in a first stage followed by contacting the effluent from the first stage with a second stage catalyst containing a crystalline zeolite having a Constraint Index greater than 2 also associated with a hydrogenation/dehydrogenation component.

WO 96/07715 describes a process for producing a high VI lubricant from a waxy feed by a process in which the waxy feed is catalytically dewaxed primarily by isomerization using a low acidity large pore zeolite isomerization catalyst containing a noble metal hydrogenation component followed by a second catalytic dewaxing step using a constrained intermediate pore crystalline molecular sieve containing a metal hydrogenation/dehydrogenation component.

EP 744,452 relates to a process for producing lubricating base oils by contacting hydrocracker bottoms with a catalyst comprising Pt and/or Pd on a refractory oxide carrier in the presence of hydrogen, separating the effluent from step 1 into a light and heavy distillate fraction and catalytically dewaxing the heavy distillate fraction.

It would be desirable to have an economic process for selectively producing a high VI, low pour point lubricating base oil under mild conditions to maximize yield and low temperature properties.

SUMMARY OF THE INVENTION

The present invention relates to a process for economically producing a lubricating oil basestock with excellent low temperature properties by dewaxing a feedstock using a first amorphous isomerization catalyst followed by a crystalline molecular sieve dewaxing catalyst. The process for producing a lubricating base oil having good low temperature properties comprises:

(1) contacting a hydrocarbon feedstock with an amorphous silica-alumina based isomerization catalyst having a pore volume less than 0.99 ml/gm ($H_2O$), an alumina content in the range of 35–55 wt % based on silica-alumina and an isoelectric point in the range of 4.5 to 6.5, and a metal hydrogenation component in the presence of hydrogen to at least partially isomerize waxy paraffins in the hydrocarbon feedstock, and (2) contacting at least a portion of the at least partially isomerized feedstock with a 10 or 12 ring shape selective intermediate pore crystalline molecular sieve containing a metal hydrogenation component in the presence of hydrogen to at least partially catalytically dewax the feedstock from step (1).

The isomerization catalyst and the dewaxing catalyst can be contained in a single reactor in a layered configuration provided that the feed-stock first contacts the isomerization catalyst. Alternatively, the isomerization catalyst and dewaxing catalyst may be in separate reactors provided that the feedstock first contacts the isomerization catalyst.

DETAILED DESCRIPTION OF THE INVENTION

Figure 1:
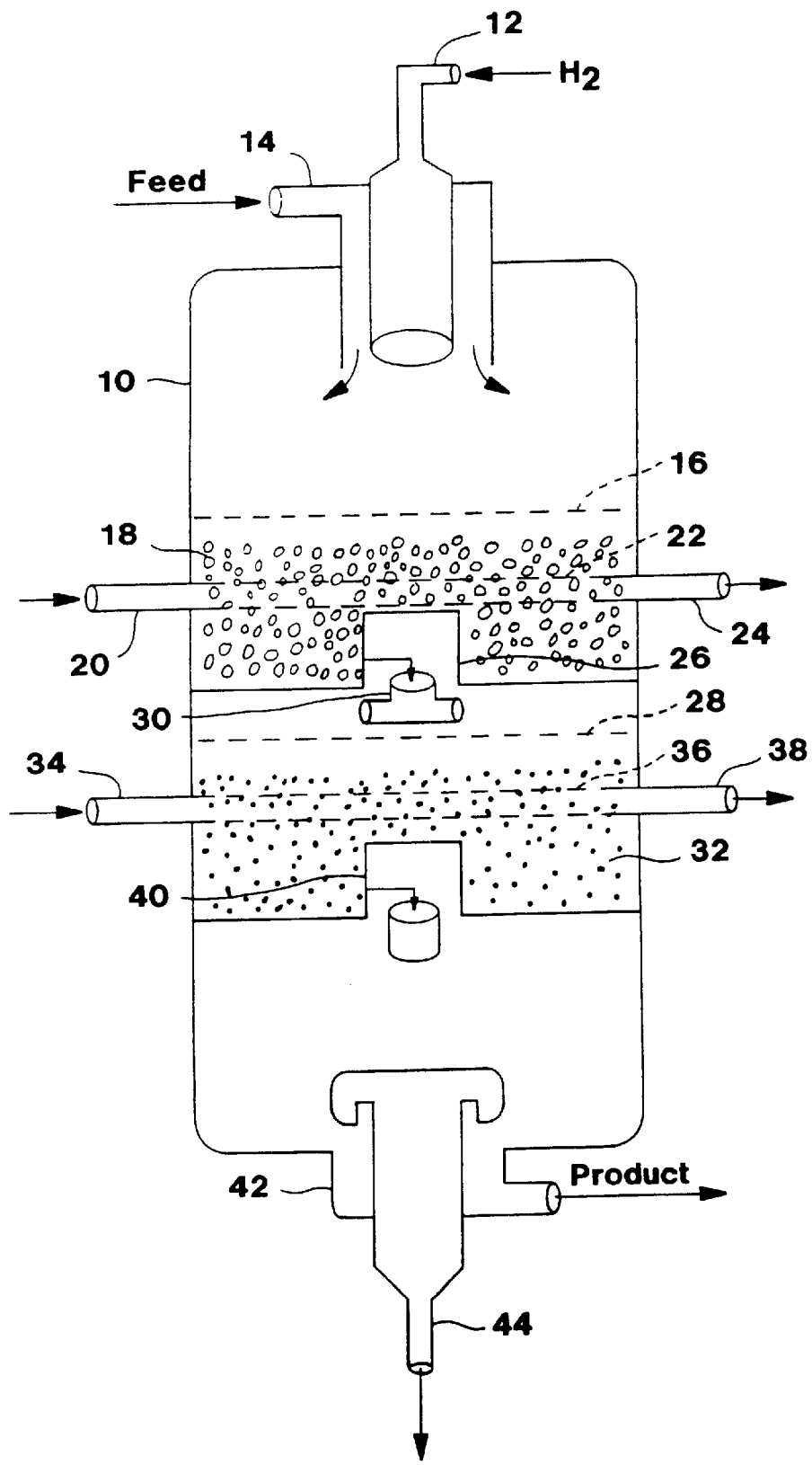
FIG. 1 is a partial diagrammatic view showing a layered catalyst in a single reactor in a process scheme for making lubricating oils.

In the process of the invention, a hydrocarbon feedstock is dewaxed by first contacting the feedstock with an isomerization catalyst and the effluent from this step contacted with a catalytic dewaxing catalyst to produce a lubricating oil basestock having good low temperature properties. While the waxy paraffinic components of a typical hydrocarbon feedstock possess good VI characteristics, it is necessary to remove or isomerize most of the waxy paraffins in order to achieve a basestock having good low temperature properties, e.g., a low pour point and a low Brookfield viscosity. Multi-ring aromatics and poly-cyclic naphthenes possess poor VI and pour point properties, and it desirable to selectively remove these species from the lubricating basestock boiling range. The present process minimizes the amount of cracking to light products not suitable as lubricating oil basestocks by selectively converting a portion of the waxy paraffins to iso-paraffins and completes pour point reduction by catalytic dewaxing by selective hydrocracking. By controlling the amount of cracking to light products, the yield of lube oil basestock is maximized.

The process according to the invention can process a wide variety of wax-containing feedstocks including feeds derived from crude oils, shale oils and tar sands as well as synthetic feeds such as those derived from the Fischer-Tropsch process. Typical wax-containing feedstocks for the preparation of lubricating base oils have initial boiling points of about 315° C. or higher, and include feeds such as reduced crudes, hydrocrackates, raffinates, hydrotreated oils, atmospheric gas oils, vacuum gas oils, coker gas oils, atmospheric and vacuum resids, deasphalted oils, slack waxes and Fischer-Tropsch wax. Such feeds may be derived from distillation towers (atmospheric and vacuum), hydrocrackers, hydrotreaters and solvent extraction units, and may have wax contents of up to 50% or more. Optionally, such feeds may be solvent dewaxed prior to the process of the invention.

Hydrocracking, hydrotreating and solvent extraction are well known in the art. Typical hydrocracking catalysts have a large pore size, and contain an acidic functionality as well as a hydrogenation component. Examples include amorphous materials such as alumina and silica-alumina and crystalline alumino-silicate materials such as zeolite X zeolite Y, and ZSM-20. Hydrocracking accomplishes ring opening as well as saturation of aromatic compounds to yield hydrocracked products of a more paraffinic character. Typical hydrocracking conditions include hydrogen pressures of from 10,335 to 17,238 kPa (1,500 to 2,500 psia), temperature of from 343 to 427° C., liquid hourly space velocity of 0.5 to 2 and hydrogen treat gas rate of 356 to 1780 m$^3$/m$^3$ (2,000 to 10,000 Scf/bbl).

Hydrotreating of feeds is directed to heteroatom removal as well as saturation of aromatics. Since nitrogen and sulfur containing compounds may be detrimental to dewaxing catalysts, feeds are hydrotreated to lower nitrogen- and sulfur-containing species to less than about 20 ppmw, preferably less than 10 ppmw. The nitrogen- and sulfur-containing species are converted under hydro-treating conditions to hydrogen sulfide and ammonia, which are typically removed by, e.g., stripping prior to the dewaxing steps. Typical hydrotreating catalysts are non-noble metal Group VIII and/or Group VIB metals on a weakly acidic inorganic support such as alumina. Examples of hydrotreating catalysts include Co/Mo, Ni/Mo or Co/Ni/Mo all on alumina. Hydrotreating reaction conditions are described in EP 225,053 B1.

Waxy feeds secured from natural petroleum sources contain quantities of sulfur and nitrogen compounds which are known to deactivate wax hydroisomerization catalysts. To prevent this deactivation it is preferred that the feed contain no more than 10 ppm sulfur, preferably less than 2 ppm sulfur and no more than 2 ppm nitrogen, preferably less than 1 ppm nitrogen.

To achieve these limits the feed is preferably hydrotreated to reduce the sulfur and nitrogen content.

Hydrotreating can be conducted using any typical hydrotreating catalyst such as Ni/Mo on alumina, Co/Mo on alumina, Co/Ni/Mo on alumina, e.g., KF-840, KF-843, HDN-30, HDN-60, Criteria C-411, etc. Similarly, bulk catalysts comprising Ni/Mn/Mo or Cr/Ni/Mo sulfides as described in U.S. Pat. No. 5,122,258 can be used.

Hydrotreating is performed at temperatures in the range 280° C. to 400° C., preferably 340° C. to 380° C. at pressures in the range 500 to 3000 psi, hydrogen treat gas rate in the range of 500 to 5000 SCF/bbl and a flow velocity in the range 0.1 to 5 LHSV, preferably 1 to 2 LHSV.

Solvent extraction is used to separate aromatics including heteroatom-containing species from paraffinic hydrocarbons. Typical solvents include phenol, N-methyl-2-pyrrolidone and furfural. The raffinate from solvent extraction which may be hydrotreated if desired to lower nitrogen and sulfur content can be used as a feedstock in the present invention.

If it is desired to remove wax as a valuable product the feedstock can be solvent dewaxed prior to catalytic dewaxing by using typical solvent dewaxers such as propane, butane, methyl ethyl ketone, methyl isobutyl ketone and mixtures thereof. The ketones can be combined with other solvents such as benzene, toluene and xylene.

Solvent dewaxing typically involves mixing the feed with chilled dewaxing solvent to form an oil-solvent solution and precipitated wax is there after separated by, for example filtration. The temperature and solvent are selected so that the oil is dissolved by the chilled solvent while the wax is precipitated.

A particularly suitable solvent dewaxing process involves the use of a cooling tower where solvent is pre-chilled and added incrementally at several points along the height of the cooling tower. The oil-solvent mixture is agitated during the chilling step to permit substantially instantaneous mixing of the pre-chilled solvent with the oil. The pre-chilled solvent is added incrementally along the length of the cooling tower so as to maintain an average chilling rate at or below 10° F./minute, usually between about 1 to about 5° F./minute. The final temperature of the oil-solvent/precipitated wax mixture in the cooling tower will usually be between 0 and 50° F. (−17.8° C. to 10° C.). The mixture may then be sent to a scraped surface chiller to separate precipitated wax from the mixture.

In general, the amount of solvent added will be sufficient to provide a liquid/solid weight ratio between the range of 5/1 and 20/1 at the dewaxing temperature and a solvent/oil volume ratio between 1.5/1 to 5/1. The solvent dewaxed oil is typically dewaxed to a pour point less than about +10° C.

In the process according to the invention, the hydrocarbon feedstock is passed sequentially through a catalyst system containing a first amorphous hydroisomerization catalyst followed by a shape selective catalytic dewaxing catalyst. While both isomerization and catalytic dewaxing can be used to dewax a waxy feed, they accomplish dewaxing by differing reaction routes. In the case of bifunctional catalysts (molecular sieve plus active metal component), the nature of the dewaxing results for waxy paraffins is dependent on several factors including the reaction temperature and pressure, the nature of the metal and the nature and number of available acidic sites, especially the density and strengths of acidic sites. While not wishing to be bound to any particular theory or reaction mechanism, it appears that the initial step with either mode of dewaxing is the formation of olefins at the active metal sites followed by the formation of carbenium ions at the acidic sites. If the primary means of reaction of these intermediate ions is isomerization, then the hydroisomerized products will be branched paraffins, i.e., iso-paraffins and molecules still useful as components of lubricating base oils. On the other hand, if the primary means of reaction of the intermediate ions is selective hydrocracking, then a portion of the reacted paraffins will be removed from the lubricating basestock boiling point range. Most catalytic dewaxing catalysts perform in a combination of these two modes to some degree. Selective hydrocracking also known as catalytic dewaxing is distinguished from hydrocracking in that the former shows significant preference for reaction of paraffinic molecules. In general, catalytic dewaxing by selective hydrocracking or paraffin hydroisomerization takes place under milder reaction conditions than those conditions for hydrocracking.

The isomerization catalyst in the present process is an amorphous (non-crystalline) material. In the case of crystalline materials such as alumino-silicates, aluminophosphates and silicoalumino phosphates, selectivity for isomerization is achieved in part by controlling the nature of pore openings. Large pore zeolites having pore diameters greater than 7.0 Å and high silica to alumina ratios (low acidities) are employed for isomerization.

In the case of amorphous isomerization catalysts according to the invention, isomerization selectivity is controlled by a combination of acidity, pore volume, alumina content and isoelectric point.

A useful scale of acidity for catalysts is based on the isomerization of 2-methyl-2-pentene as described by Kramer and McVicker, J. Catalysis, 92, 355 (1985). In this scale of acidity, 2-methyl-2-pentene is subjected to the catalyst to be evaluated at a fixed temperature, typically 200° C. In the presence of catalyst sites, 2-methyl-2-pentene forms a carbenium ion. The isomerization pathway of the carbenium ion is indicative of the acidity of active sites in the catalyst. Thus weakly acidic sites form 4-methyl-2-pentene whereas strongly acidic sites result in a skeletal rearrangement to 3-methyl-2-pentene with very strongly acid sites forming 2,3-dimethyl-2-butene. The mole ratio of 3-methyl-2-pentene to 4-methyl-2-pentene can be correlated to a scale of acidity. This acidity scale ranges from 0.0 to 4.0. Very weakly acidic sites will have values near 0.0 whereas very strongly acidic sites will have values approaching 4.0. The isomerization catalysts useful in the present process have acidity values of from about 0.5 to 2.5, preferably 0.5 to 2.0. The acidity of metal oxide supports can be controlled by adding promoters and/or dopants, or by controlling the nature of the metal oxide support, e.g., by controlling the amount of silica incorporated into a silica-alumina support. Examples of promoters and/or dopants include halogen, especially fluorine, phosphorus, boron, yttria, rare-earth oxides and magnesia. Promoters such as halogens generally increase the acidity of metal oxide supports while mildly basic dopants such as yttria or magnesia tend to decrease the acidity of such supports.

The amorphous isomerization catalyst is a silica-alumina based catalyst having a pore volume less than 0.99 ml/gm ($H_2O$), preferably less than 0.8 ml/gm ($H_2O$), and most preferably less than 0.6 ml/gm ($H_2O$). As is known in the art, the term "pore volume ($H_2O$) refers to pore volume measured by drying the catalyst to about 500° C., weighing the dried catalyst, immersing it in water for 15 minutes, removing the material from the water and centrifuging to remove surface water. Then the material is weighed and the pore volume is determined from the differences in weight between the dried catalyst and the latter material.

In addition to its pore volume, the silica-alumina of the catalyst is further characterized as having an alumina content in the range of 35 to 55 wt %, preferably 35 to 50 wt %, most preferably 38 to 45 wt %, based on the isomerization catalyst.

Another criteria of the silica-alumina used in the isomerization catalyst is that it has an isoelectric point from 4.5 to 6.5. As is known in the art, the isoelectric point of a material depends on the relative concentration and the acidity ($pK_a$/$pK_b$) of surface species (G. A. Parks, *Chem. Review*, 177–198 (1965)).

Optionally the silica-alumina based catalyst material can be promoted or doped with e.g., yttria or with a rare earth oxide, e.g., La, Ce, etc., or with e.g., boria, magnesia. In this particular embodiment, the isoelectric point will increase depending on the dopant and dopant level to a level not more than 2 points higher than that of the base silica-alumina.

The isomerization catalyst also contains a metal hydrogenation component which may be at least one of a Group VIB and Group VIII metal, preferably a Group VIII metal, more preferably a Group VIII noble metal, especially Pt, Pd, or mixtures thereof The amount of metal hydrogenation component is from 0.1 to 30 wt %, based on isomerization catalyst, preferably from 0.3 to 20 wt %.

The hydroisomerization process utilizing the catalyst of the present invention is conducted at temperatures between about 200° C. to 400° C., preferably 250° C. to 380° C., and most preferably 300° C. to 350° C. at hydrogen partial pressure between about 350 to 5000 psig (2.41 to 34.6 mPa), preferably 1000 to 2500 psig (7.0 to 17.2 mPa), a hydrogen gas treat ratio of 500 to 10,000 SCF $H_2$/bbl (89 to 1780 $m^3/m^3$), preferably 2,000 to 5,000 SCF $H_2$/bbl (356 to 890 $m^3/m^3$) and a LHSV of 0.1 to 10 v/v/hr, 0.5 to 5 v/v/hr, preferably 1 to 2 v/v/hr.

By choosing relatively mild conditions, isomerization of waxy components (n-paraffins and slightly branched paraffins) to isoparaffinic materials can be accomplished with a minimum of cracking to non-lube (boiling below 343° C.) products. While these isoparaffinic materials may have a high VI, some individual species may also may have pour points too high to meet the low temperature requirements of modem basestocks. Also, it is not feasible to isomerize all of the waxy components in the feed. Thus there is a need to catalytically dewax the products from this first stage to lower the pour point to desired target range.

Catalysts useful in the catalytic dewaxing step include crystalline 10 and 12 ring molecular sieves and a metal hydrogenation component. Crystalline molecular sieves include metallo-, e.g., alumino silicates, alumino phosphates and silicoaluminophosphates. Examples of crystalline alumino silicates include zeolites such as ZSM-5, ZSM-11, ZSM-12, Theta-1 (ZSM-22), ZSM-23, ZSM-35, ZSM-48 natural and synthetic ferrierites, ZSM-57, Beta Mordenite and Offretite. Examples of crystalline alumino and silicoalumino-phosphates include SAPO-11, SAPO-41, SAPO-3 1, MAPO-11 and MAPO-31. Preferred include ZSM-5, ZSM-22, ZSM-23, ferrierites, and SAPO-11.

The dewaxing catalyst may also contain an amorphous component. The acidity of the amorphous component is preferably from 0.5 to 2.5 on the Kramer/McVicker acidity scale described above. Examples of amorphous materials include silica-alumina, halogenated alumina, acidic clays, silica-magnesia, yttria silica-alumina and the like. Especially preferred is silica-alumina.

The dewaxing catalyst may also include a matrix or binder which is a material resistant to process conditions and which is substantially non-catalytic under reaction conditions. Matrix materials may be synthetic or naturally occurring materials such as clays, silica and metal oxides. Matrix materials which are metal oxides include single oxides such as alumina, binary compositions such as silica-magnesia and ternary compositions such as silica-alumina-zirconia.

If the dewaxing catalyst contains an active amorphous component, the crystalline molecular sieve/metal hydrogenation component/amorphous component may be composited together. In the alternative disclosed herein, the crystalline molecular sieve and amorphous component can be in a layered configuration wherein it is preferred the top layer in the reaction vessel is the amorphous component and the lower layer is the crystalline molecular sieve. In this alternative configuration it is preferred that the metal hydrogenation component be present on both components.

The metal hydrogenation component of the dewaxing catalyst may be at least one metal from the Group VIB and Group VIII of the Periodic Table (published by Sargent-Welch Scientific Company). Preferred metals are Group VIII noble metals, especially palladium and platinum. Metals may be added to the catalyst by means well known in the art such as metal impregnation with a soluble salt.

The dewaxing catalyst may contain, based on the weight of total catalyst, from 5 to 95 wt % of crystalline molecular sieve, from 0 to 90 wt % of amorphous component and from 0.1 to 30 wt % of metal hydrogenation component with the balance being matrix material.

Process conditions in the catalytic dewaxing zone include a temperature of from 260 to 420° C., preferably 270 to 400° C., a hydrogen partial pressure of from 2.41 to 34.5 mPa (350 to 5000 psi), preferably 5.52 to 20.7 mPa, a liquid hourly space velocity of from 0.1 to 10 v/v/hr, preferably 0.5 to 3.0, and a hydrogen circulation rate of from 89 to 1780 $m^3/m^3$ (500 to 10000 scf/bbl), preferably 178 to 890 $m^3/m^3$.

The amount of dewaxing by selective hydrocracking to lower boiling materials will be a function of the nature of the isomerate from the isomerization zone, the dewaxing properties of the molecular sieve chosen and the desired target pour point. In general, the lower the pour point chosen, the greater the conversion to lower boiling point non-lube products because more severe selective hydrocracking conditions will be required.

The process of the invention may occur by using a single reactor containing two separated beds of isomerization and dewaxing catalyst, or make take place in separate reactors, e.g., a cascade reactor system in which the first reactor contains the isomerization catalyst and the second reactor the dewaxing catalyst optionally with inter-reactor separation of the liquid and gaseous products with the liquid products being further processed in the dewaxing reactor. Either configurations offers advantages over a single catalyst system, including those in which the two respective dewaxing functions are combined into a single or composite catalyst.

Each catalyst phase may be used at its ideal reactor conditions to obtained the desired final basestock properties. If the target properties are high VI and lower viscosities, then the reactor conditions can be made more severe in first bed of isomerization catalyst. This will result in lower lube basestock yields. On the other hand, if a higher yield is the desired result, then the severity of the conditions in the first isomerization catalyst bed should be reduced. This will result in lower VI and higher viscosities.

As normal catalyst deactivation occurs, it is expected that the two catalyst will deactivate at different rates. The separate temperature control possible for the individual catalyst beds will allow maintenance of the desired conversion rates over each respective catalyst. Also, separate temperature control allows the operator to rapidly and efficiently adjust operation of the separate beds to meet product quality/quantity objectives. The layered or stacked bed configuration permits much greater feed flexibility over traditional dewaxing. For example, feeds may have widely varying wax contents. Finally, the first isomerization bed increases the relative pour point reduction activity of the second dewaxing bed. This may occur due to the cracking out and saturation of some fraction of the aromatics present in the feedstock as well as by the isomerization of a fraction of the wax present in the feedstock, particularly those higher carbon number wax molecules which may be more difficult for a molecular sieve catalyst to isomerize or crack from the feedstock.

Figure 2:
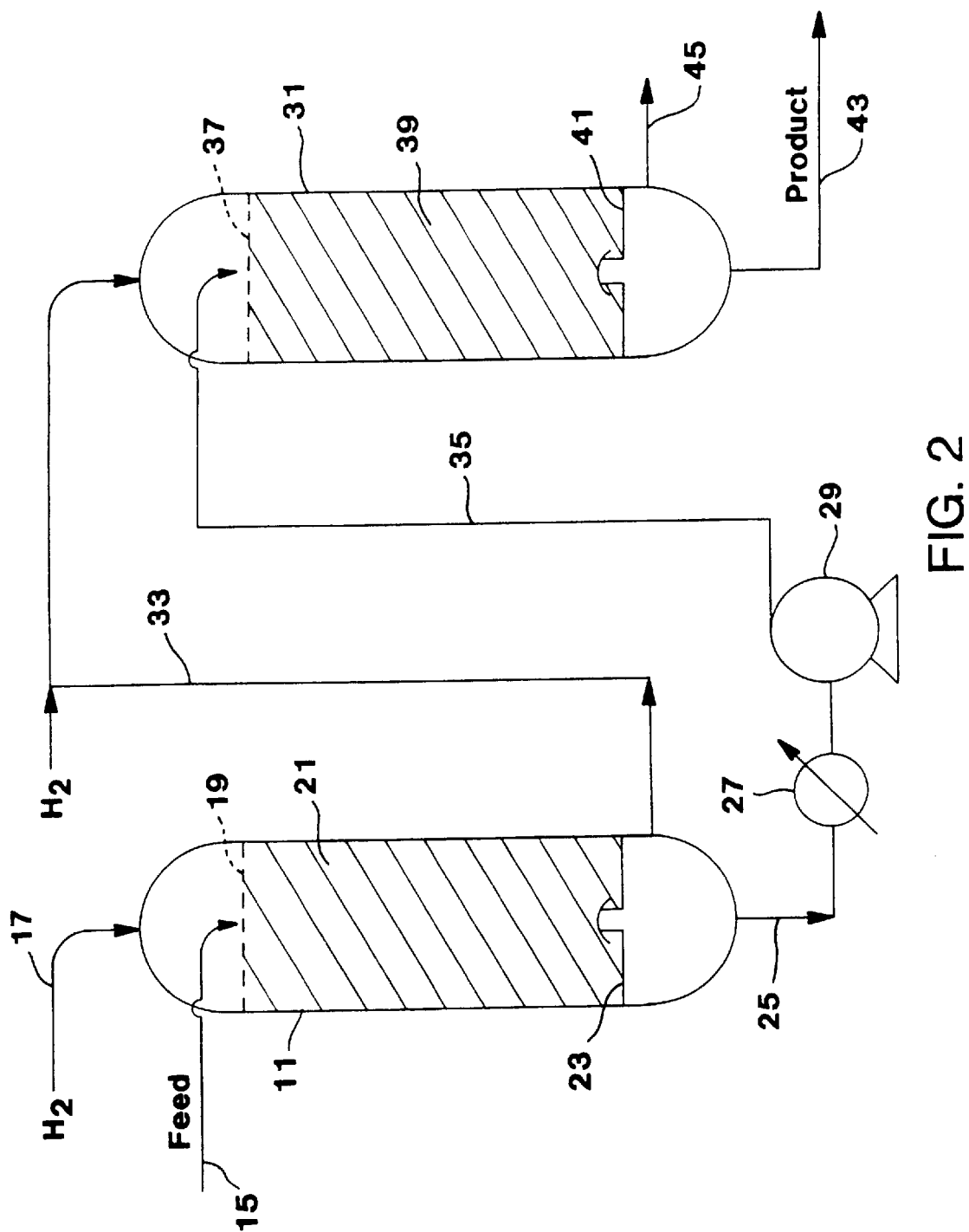
FIG. 2 is a schematic flow diagram showing a two reactor system for making lubricating oils.

The process is further exemplified in FIGS. 1 and 2. FIG. 1 is a schematic flow diagram showing a layered catalyst configuration. In FIG. 1, hydrogen gas enters reactor 10 through line 12. Heated feedstock is added to reactor 10 through line 14 where it is distributed over the reactor diameter by plate 16. After passing through distributor 16, feed contacts catalyst bed 18 containing amorphous isomerization catalyst. Catalyst bed 18 is heated to the desired temperature by hot gas such as steam or other heating means entering line 20 to heating coil 22 and exiting through line 24. Feedstock, which is at least partially isomerized in catalyst bed 18, flows through separator 26. Separator 26 has sides with openings of such size as to admit hydrogen and feed but not catalyst. Isomerized feed is then conducted to a second distribution plate 28 through conduit 30. Upon passing through distributor 28, isomerized feed contacts catalytic dewaxing bed 32. Catalyst bed 32 is also heated to the desired temperature by circulating hot gas entering through line 34 to heating coil 36 and exit line 38. The temperature in bed 32 may be different from bed 18 to achieve the desired conversion level and product quality. Dewaxed product then exits bed 32 by passing through separator 40 where it is collected in collector 42. Hydrogen gas exits reactor 10 by line 44.

FIG. 2 is a schematic flow diagram showing another embodiment of the invention. Heated feedstock enters reactor 11 through line 15. Hydrogen gas is admitted to reactor 11 via line 17. Feedstock passes through distributor 19 to catalyst bed 21 containing amorphous isomerization catalyst. Reactor 11 is heated to maintain the desired temperature in catalyst bed 21 by heating coils (not shown). The at least partially isomerized feedstock is separated from catalyst via separator and is conducted through line 25 to heat exchanger 27. After being heated to the desired temperature, isomerized feedstock is passed to pump 29 and on to reactor 31 via line 35. Hydrogen gas from reactor 11 is conducted to reactor 31 by line 33. Make-up hydrogen can be added to line 33 if desired. Upon entering reactor 31, isomerized feedstock passes through distributor 37 where it is then contacted with catalyst bed 39 containing dewaxing catalyst. Reactor 31 is heated to maintain the desired temperature in catalyst bed 39 by heating coils (not shown). The temperature in reactor 31 may be different from that of reactor 21 and is adjusted as needed to maintain the desired conversion level and product quality. Dewaxed feedstock is then separated from catalyst by separator 41 and is withdrawn via line. Hydrogen gas is withdrawn from reactor 31 by line 45.

The total liquid product from either the layered catalyst system of FIG. 1 or the two reactor system of FIG. 2 may require post-treatment to adjust product quality parameters such as color, toxicity, or haze. Hydrofinishing is commonly employed to adjust such product quality parameters. Process conditions for hydrofinishing are mild to minimize product loss through cracking. Conventional hydrofinishing catalysts include non-noble metal Group VIII and/or Group VI metals such as Ni/Mo, Co/Mo, Ni/W, Ni/Co/Mo and the like on non-acidic or weakly acidic supports such as silica or alumina. The catalyst may be activated prior to use by sulfiding or other conventional method.

Reaction conditions in the hydrofinishing unit are mild and include a temperature of from 260° C. to 360° C., preferably 290° C. to 350° C., more preferably 290° C. to 330° C., a hydrogen partial pressure of from 1000 to 2500 psig (7.0 to 17.3 mPa), preferably 1000 to 2000 psig (7.0 to 13.9 mPa), a space velocity of from 0.2 to 5.0 LHSV, preferably 0.7 to 3.0 LHSV, and a hydrogen to feed ratio of from 500 to 5000 SCF/bbl (89 to 890 m$^3$/m$^3$), preferably 2000 to 4000 Scf/bbl (356 to 712 m$^3$/m$^3$). The catalyst in the cold hydrofinishing unit may be the same as in the first hydroconversion unit. However, more acidic catalyst supports such as silica-alumina, zirconia and the like may be used in the cold hydrofinishing unit.

The invention is further illustrated by the following non-limiting examples.

EXAMPLES

Example 1

In this example, a waxy hydrocracker bottoms feedstock designated as HCIS, was hydroconverted over a 0.5% Pt/4.0% yttria on silica-alumina catalyst with a pore volume of 0.54 ml/gm (H$_2$O), and alumina content of 45 wt % based on silica-alumina and an isoelectric point of 6.08 (designated as Catalyst D), over a Pd/Pt on ferrierite based catalyst (designated as Catalyst B), and over both catalysts in a cascaded reactor sequence. In all cases the reactor pressure was 1000 psig of hydrogen at a flow rate of 2500 scf/bbl.

Catalyst D Alone

The following data was obtained for hydroconversion using only 0.5% Pt on silica-alumina (Catalyst A), which does not reduce pour points to the desired levels, follow by solvent dewaxing (SDW).

TABLE 1

Catalyst D

| | 350° C.+ Yield (%) | VI | Reactor Temp. (° C.) | Pour Point after SDW (° C.) | Grams Dry Wax in 350° C.+ per 100 grams feed | Wax Converted to Oil or 350° C.− Products | Calculated Dewaxed Oil Yield (%) | Dewaxed Oil Yield Loss (%) |
|---|---|---|---|---|---|---|---|---|
| SDW - Waxy Product | 86 | 112 | Solvent Dewaxed | −22 | 18.0 | — | 67.9 | — |
| Hydro-Converted Products | 75 | 117 | 340 | −23 | 12.8 | 29% | 62.2 | 5.7 |
| | 70 | 117 | 340 | −23 | 12.6 | 30% | 57.4 | 10.5 |
| | 73 | 120 | 340 | −19 | 11.7 | 35% | 61.3 | 6.6 |
| | 61 | 118 | 360 | −24 | 8.5 | 53% | 52.5 | 15.4 |
| | 61 | 120 | 360 | −17 | 10.4 | 42% | 50.6 | 17.3 |
| | 63 | 118 | 360 | −19 | 11.3 | 37% | 51.7 | 16.2 |
| | 75 | 117 | 340 | −20 | 13.5 | 25% | 61.5 | 6.4 |
| | 74 | 117 | 340 | −21 | 13.3 | 26% | 60.7 | 7.2 |
| | 76 | 118 | 340 | −20 | 14.4 | 20% | 61.6 | 6.3 |

It may be seen that during hydroconversion over Catalyst D, a significant increase in VI is obtained as compared to the non-hydroconverted feedstock where both are solvent dewaxed to similar pour points. It may further be seen, based on the amount of dry wax obtained during post-hydroprocessing solvent dewaxing, that a significant percentage of the wax originally present in the feedstock is either converted to "oil" or cracked to 350° C.− products by Catalyst D hydroconversion. The observation that the percentage conversion of wax is significantly greater than the percentage loss of dewaxed oil, coupled with the observed VI increase strongly indicates that significant wax isomerization took place.

Catalyst B Alone

The same waxy feedstock was also hydroconverted/dewaxed using a Pd/Pt on ferrierite catalyst (Catalyst B) and in a cascaded reactor sequence of Catalyst A followed by Catalyst B. Identical reactor pressure and hydrogen flow conditions were used as above. The following 350° C.+ product yields and VI's were obtained.

TABLE 2

| | Reactor Temperature | Pour Point (° C.) | Yield (%) | VI |
|---|---|---|---|---|
| SDW | — | −22 | 68 | 112 |
| Catalyst B | 310 | −20 | 67 | 113 |
| | 320 | −26 | 66 | 112 |
| | 330 | −32 | 59 | 112 |
| | 340 | −38 | 58 | 111 |

TABLE 3

Catalyst A followed by Catalyst B Cascaded Reactor Configuration

|  | Temperature 1 | Temperature 2 | Pour Point (° C.) | Yield (%) | VI |
|---|---|---|---|---|---|
| SDW | — | — | −22 | 68 | 112 |
|  | 340 | 310 | −23 | 57 | 115 |
|  | 340 | 310 | −21 | 55 | 115 |
|  | 340 | 310 | −23 | 56 | 114 |
|  | 340 | 340 | −35 | 48 | 113 |
|  | 340 | 340 | −38 | 51 | 113 |
|  | 340 | 3340 | −38 | 49 | 113 |

Here it may be that the stacked bed configuration (cascaded rector configuration) gives dewaxed product with higher VI than that obtained using the Catalyst B dewaxing catalyst alone.

Figure 3:
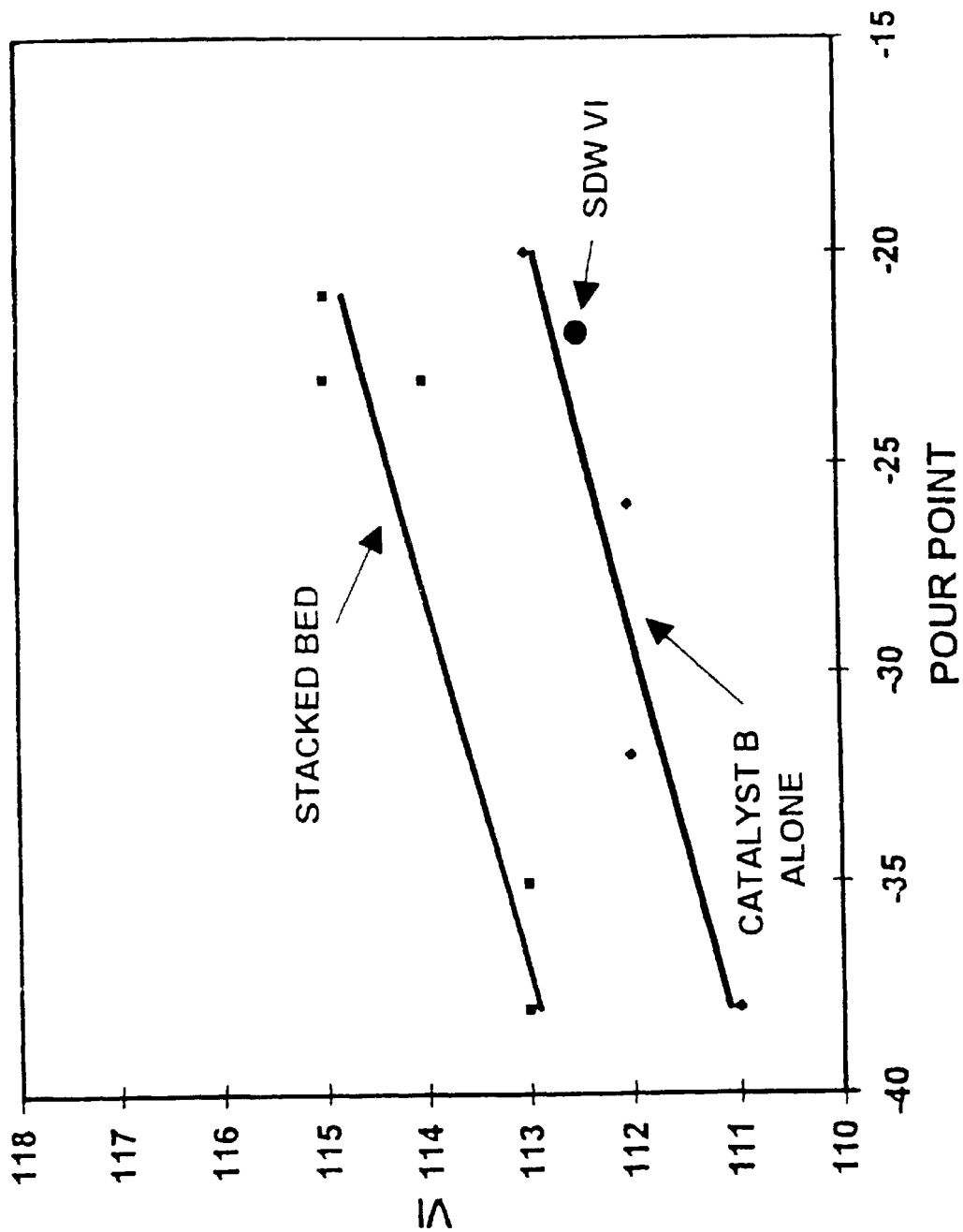
FIG. 3 is a graph showing VI as a function of pour point for a Catalyst A/Catalyst B stacked bed configuration vs. Catalyst B alone.
Figure 4:
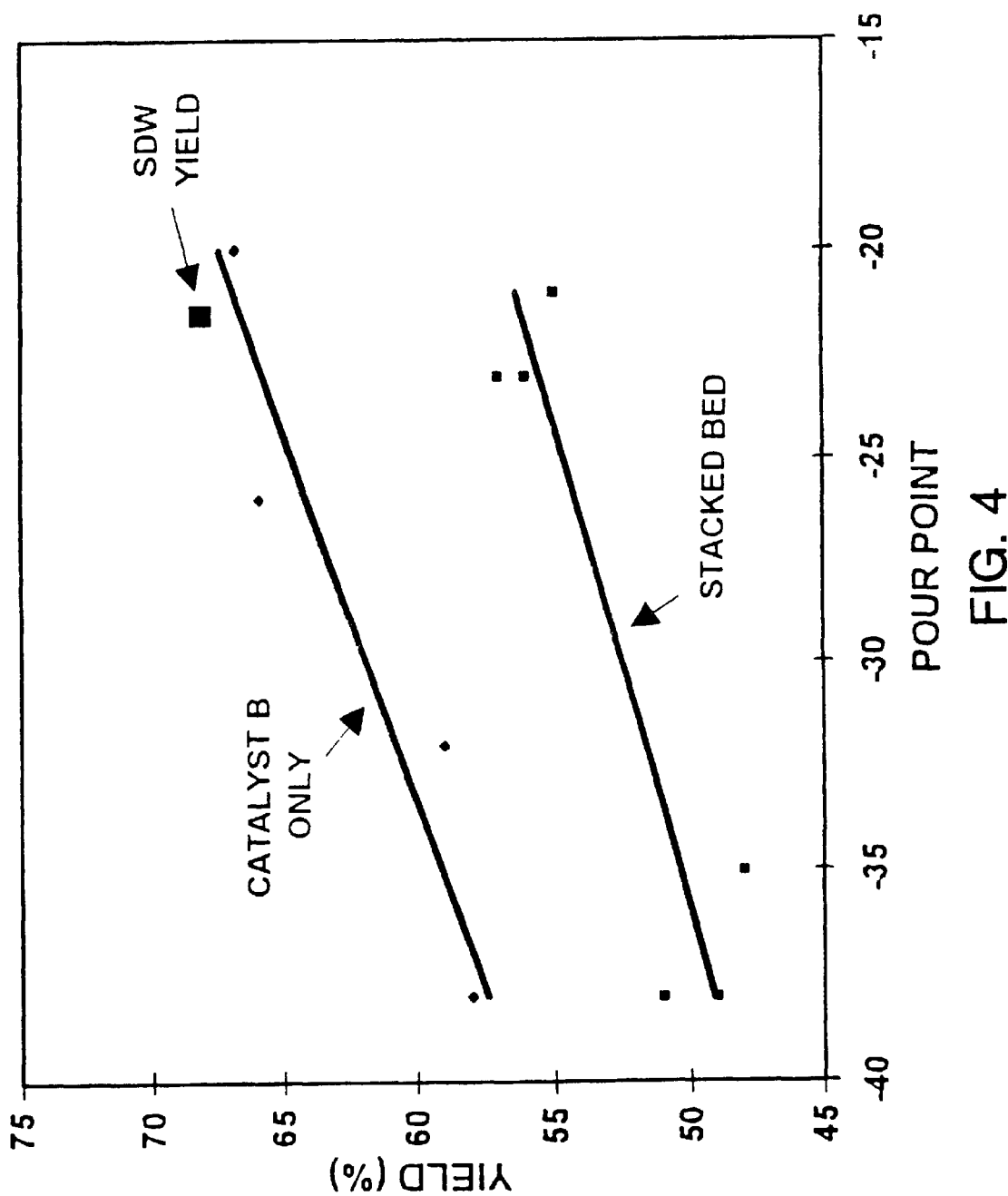
FIG. 4 is a graph showing yield as a function of pour point for a Catalyst A/Catalyst B stacked bed configuration vs. Catalyst B alone.

The 350 ° C.+ product yields (FIG. 3) and VI's (FIG. 4) as a function of pour point are compared graphically for the Catalyst B alone and the Catalyst A/Catalyst B stacked bed configuration.

Example 2

This example is directed to a comparison of a 0.5% Pt/silica-alumina catalyst with a pore volume of 0.54 ml/gm ($H_2O$), and alumina content of 45 wt % based on silica-alumina and an isoelectric point of 5.41 (designated Catalyst A) with a 0.5% Pt/Theta-1 based catalyst (Catalyst C). The feed is a waxy lubes hydrocracker distillate which was processed at a reactor pressure of 1000 psig hydrogen and a hydrogen flow rate of 2500 scf/bbl.

The following graphical presentation of 350° C.+ topped yields and VI's (FIG. 5 and FIG. 6) show a comparison of:
1. A Catalyst A first, Catalyst C second, stacked bed configuration (4.5:1 ratio of Catalyst A:Catalyst C) wherein Catalyst C phase was additionally composited with 0.4/% Pt/alumina in a 1:4.5 ratio of Catalyst C:alumina.
2. A Catalyst C/Catalyst A composited catalyst (4.5:1 ratio of Catalyst A:Catalyst C) wherein the bed was additionally diluted with a 0.4% Pt/alumina in a 3.85:3.15 ratio of composite:alumina.
3. An alumina/Catalyst C composited catalyst (3:1 ratio of alumina:Catalyst C) wherein Catalyst C contained 0.5% Pt and the alumina contained 0.6% Pt.

Figure 5:
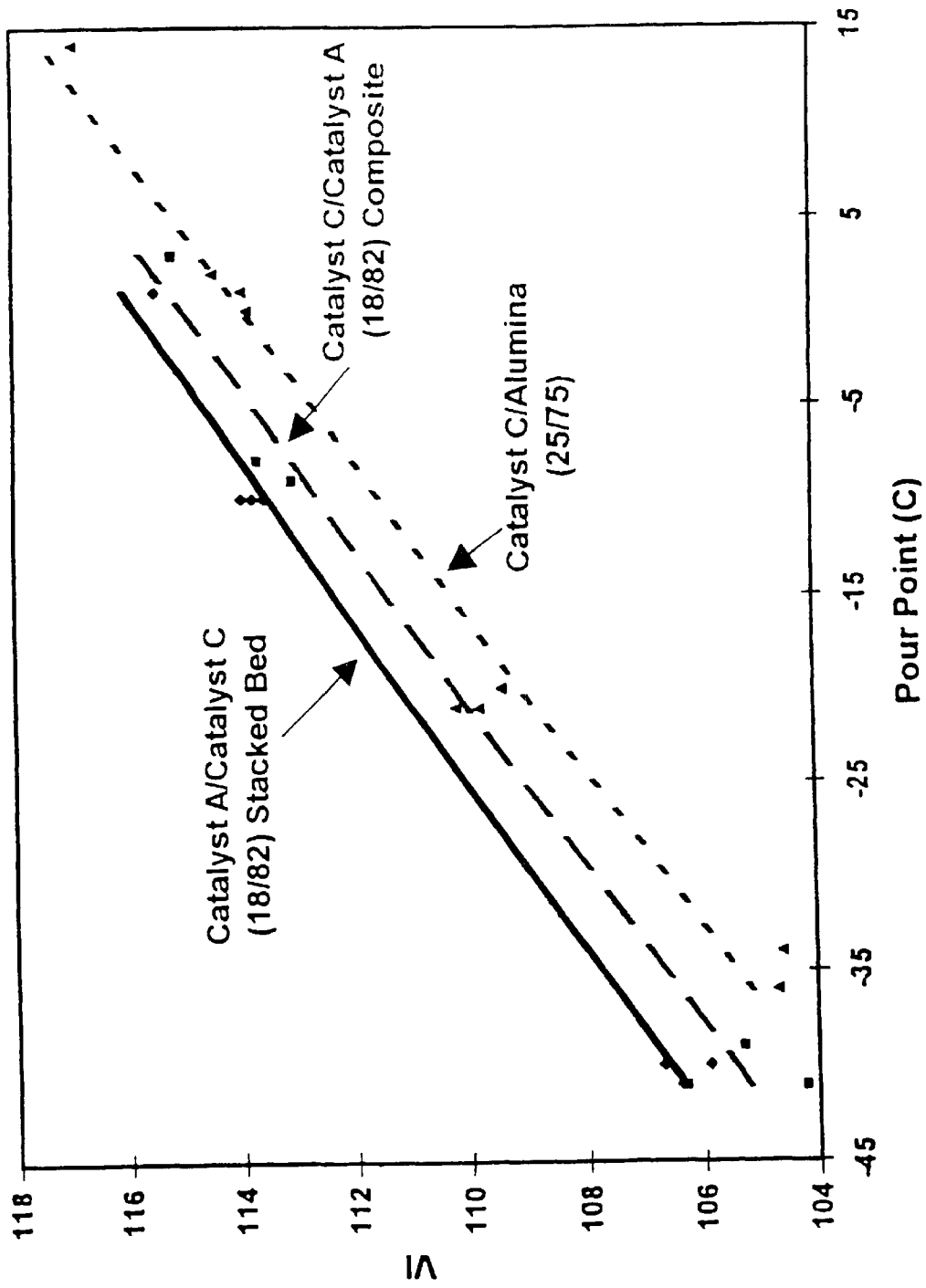
FIG. 5 is a graph showing VI as a function of pour point for a Catalyst A/Catalyst C stacked bed configuration vs. Catalyst A/Catalyst C composite vs. Catalyst C/alumina.
Figure 6:
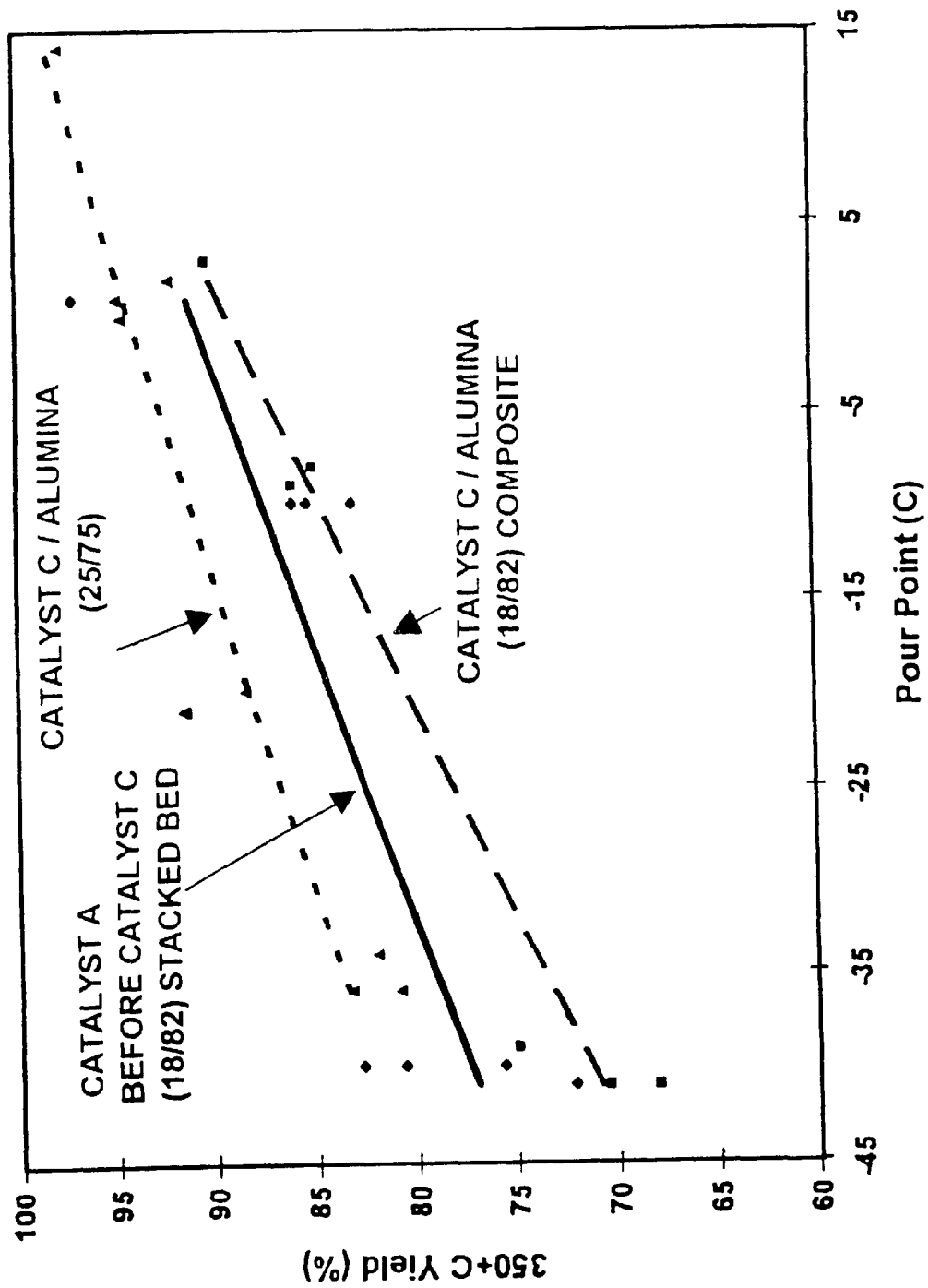
FIG. 6 is a graph showing 350° C.+ yield as a function of pour point for a Catalyst A/Catalyst C stacked bed configuration vs. Catalyst A/Catalyst C composite vs. Catalyst C/alumina.

In FIG. 5 it may be seen that the highest VI's (as a function of pour point are produced by the Catalyst A first stacked bed configuration. Yields for the stacked bed are higher than for a composite catalyst, albeit lower than for a zeolite only single catalyst (FIG. 6).

Example 3

The following example shows a comparison of the 350° C.+ yields and VI's produced by a Catalyst A first, Catalyst C second, stacked bed configuration as compared to a "reversed stacked bed" with Catalyst A second and Catalyst C first.

Figure 7:
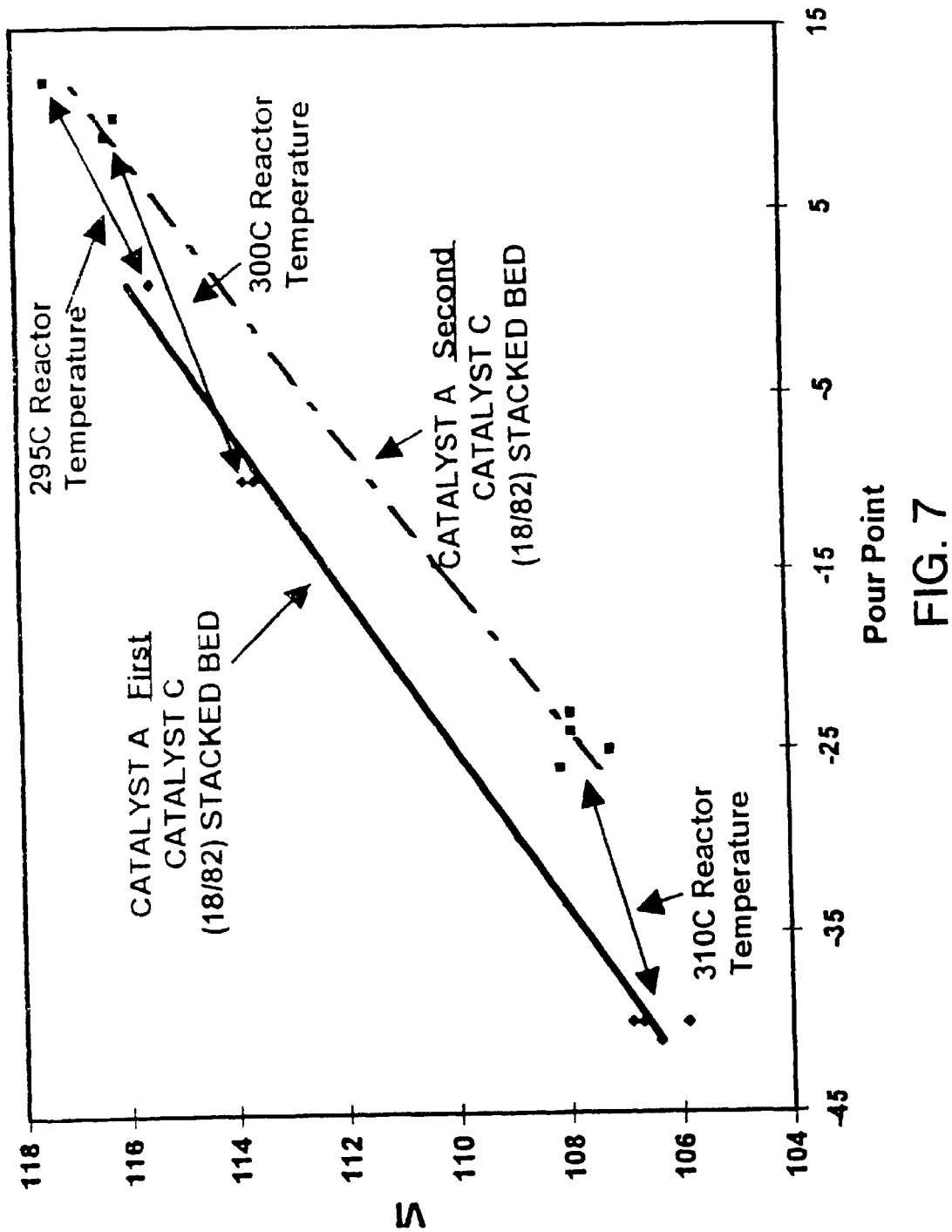
FIG. 7 is a graph showing VI as a function of pour point for a Catalyst A first, Catalyst C second stacked bed configuration vs. a Catalyst A second, Catalyst C first stacked bed configuration.
Figure 8:
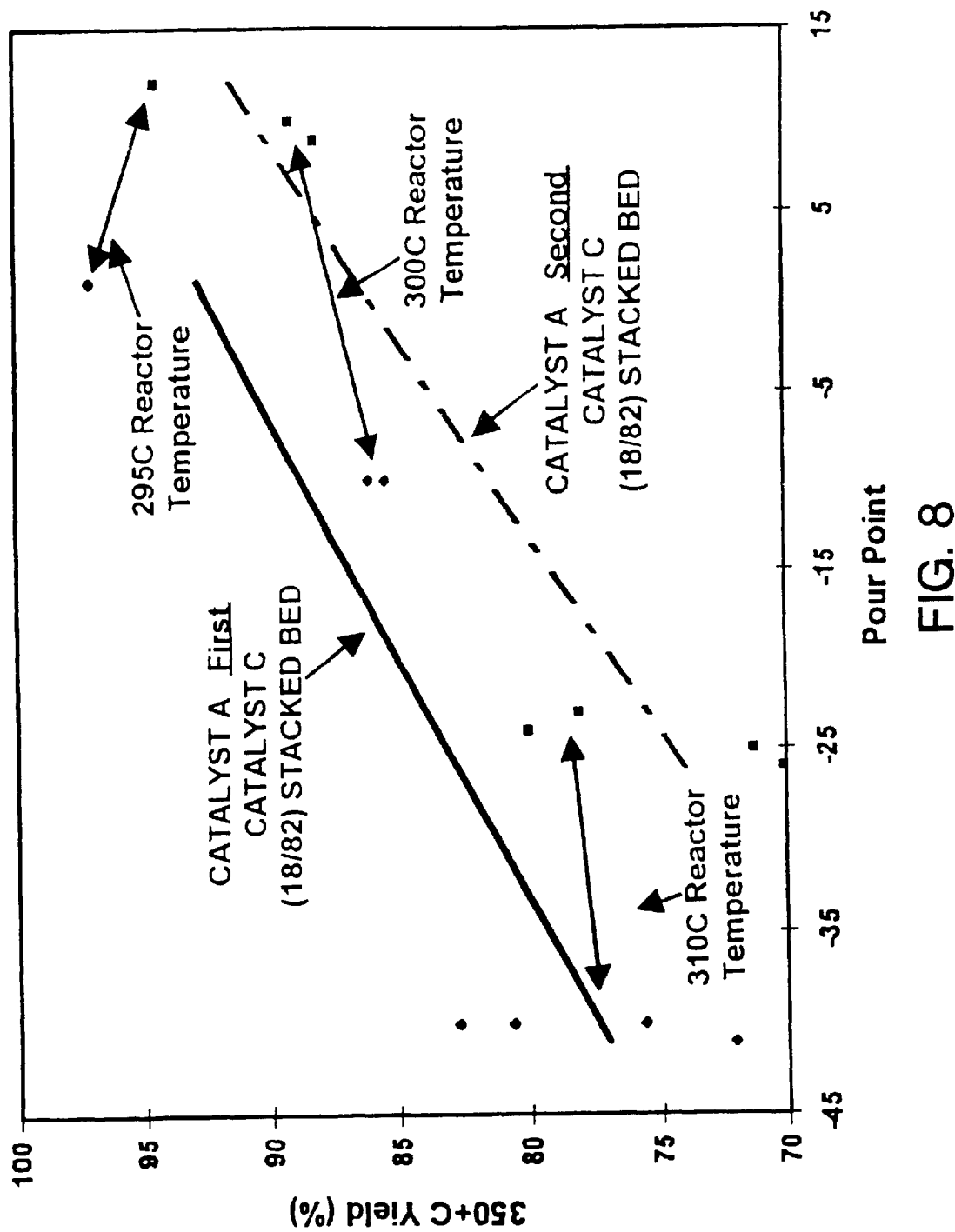
FIG. 8 is a graph showing 350° C.+ yield as a function of pour point for a Catalyst A first, Catalyst C second stacked bed configuration vs. a Catalyst A second, Catalyst C first stacked bed configuration.

The data in FIG. 7 (VI vs. pour point) and FIG. 8 (350° C.+ yield vs. pour point) shows that the Catalyst A first configuration gives higher dewaxing activity (obtained in the Catalyst A bed) at equivalent reactor temperatures than does the reversed stacked bed configuration.

The Catalyst A first configuration has an advantage in that keeping a lower zeolite bed temperature will extent useful run lengths or allow a design with a higher zeolite bed space velocity and hence a smaller, less expensive reactor.

Example 4

In this example, a waxy hydrocracker bottoms feedstock designated as LVIS, was hydroconverted over Catalyst A at a reactor pressure of 1000 psig of hydrogen at a flow rate of 2500 scf/bbl.

The following data was obtained for hydroconversion using only Catalyst A, which does not reduce pour points to the desired levels, follow by solvent dewaxing (SDW).

TABLE 4

Catalyst A

|  | 350° C.+ Yield (%) | VI | Reactor Temp. (° C.) | Pour Point after SDW (° C.) | Grams Dry Wax in 350° C.+ per 100 grams feed | Wax Converted to Oil or 350° C.- Products | Calculated Dewaxed Oil Yield (%) | Dewaxed Oil Yield Loss (%) |
|---|---|---|---|---|---|---|---|---|
| SDW - Waxy Product | 99.8 | 107 | Solvent Dewaxed | −21 | 17.8 | — | 82.0 | — |
| Hydro-Converted Products | 74.5 | 114 | 310 | −19 | 9.1 | 49% | 65.4 | 16.6 |
|  | 75.6 | 114 | 310 | −20 | 10.4 | 41% | 65.2 | 16.8 |
|  | 83.8 | 112 | 300 | −15 | 12.0 | 32% | 71.7 | 10.3 |
|  | 83.7 | 111 | 300 | −24 | 13.0 | 27% | 70.7 | 11.3 |
|  | 87.2 | 111 | 295 | −19 | 12.9 | 28% | 74.3 | 7.7 |
|  | 89.9 | 110 | 290 | −19 | 14.4 | 19% | 75.5 | 6.6 |
|  | 89.2 | 109 | 290 | −20 | 16.0 | 10% | 73.2 | 8.8 |
|  | 88.8 | 110 | 290 | −20 | 17.1 | 4% | 71.8 | 10.3 |
|  | 91.5 | 109 | 290 | −21 | 14.5 | 18% | 77.0 | 5.1 |
|  | 90.0 | 110 | 290 | −18 | 14.4 | 19% | 75.6 | 6.4 |
|  | 91.9 | 110 | 290 | −18 | 14.6 | 18% | 77.3 | 4.7 |

It may again be seen that during hydroconversion over Catalyst A, a significant increase in VI is obtained as compared to the non-hydroconverted feedstock where both are solvent dewaxed to similar pour points. It may further be seen, based on the amount of dry wax obtained during post-hydroprocessing solvent dewaxing, that generally a significant percentage of the wax originally present in the feedstock is either converted to "oil" or cracked to 350° C.- products by Catalyst A hydroconversion. The observation that the percentage conversion of wax is generally greater than the percentage loss of dewaxed oil, coupled with the observed VI increase strongly indicates that significant wax isomerization took place.

Example 5

In this example, individual balances of hydroconversion reaction products generated in Example 4, prior to solvent dewaxing, were consolidated to generate two feeds (designated Feed-10 indicated with solid square and Feed-25 indicated with solid triangles) in sufficient quantity for a second hydroprocessing reaction over dewaxing Catalyst C and a 0.5% Pt/high silica ferrierite catalyst (designated Catalyst E), as well as the non-hydroprocessed waxy product whose solvent dewaxed properties are given in Table 5 (designated as Feed-0 indicated by solid diamonds) (the waxy product was used as a feed without prior solvent dewaxing). The properties of the two consolidated feeds and their designations are:

TABLE 5

Feed Properties and Designations

| Feed Designation | VI* | Reactor Temp (° C.) | Pour Point after SDW (° C.) | % Dry Wax in 350° C. + Composited Product |
|---|---|---|---|---|
| Feed-10 (~10% Pre-Converted Feed) | 110 | 295 | −19 | 15.6 |
| Feed-25 (~25% Pre-Converted Feed) | 115 | 310 | −19 | 14.7 |

*VI following feed solvent dewaxing to −19° C. pour point. Feed was not solvent dewaxed prior to use as a feed for catalytic dewaxing.

Figure 9:
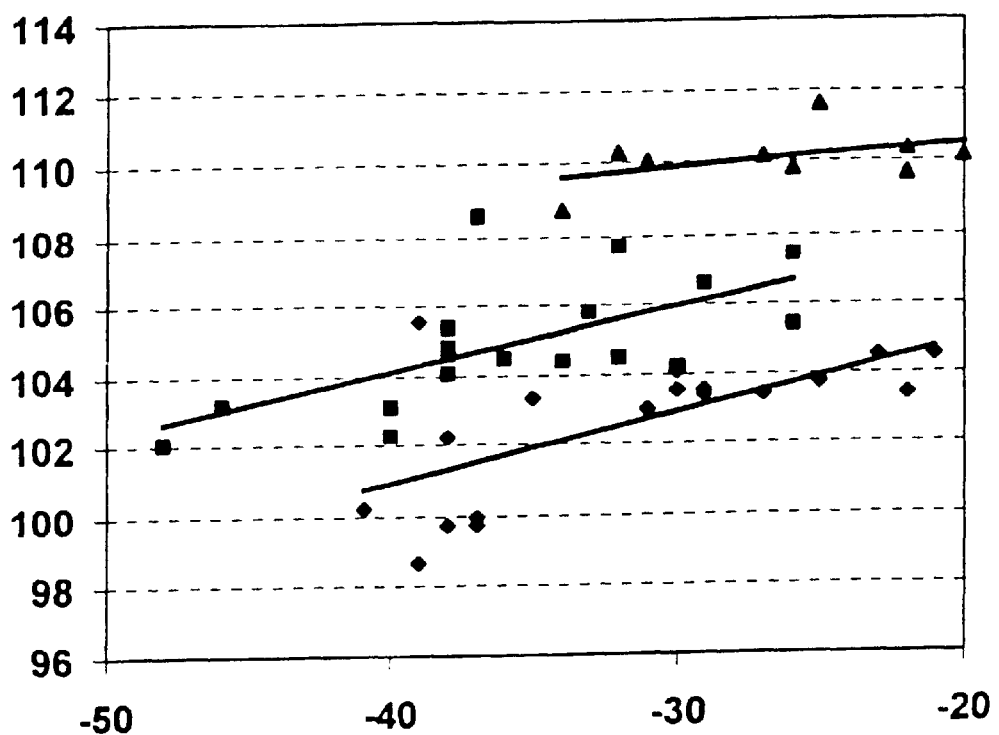
FIG. 9 is a graph of VI versus Pour Point (° C.) for three feeds for Catalyst C.
Figure 10:
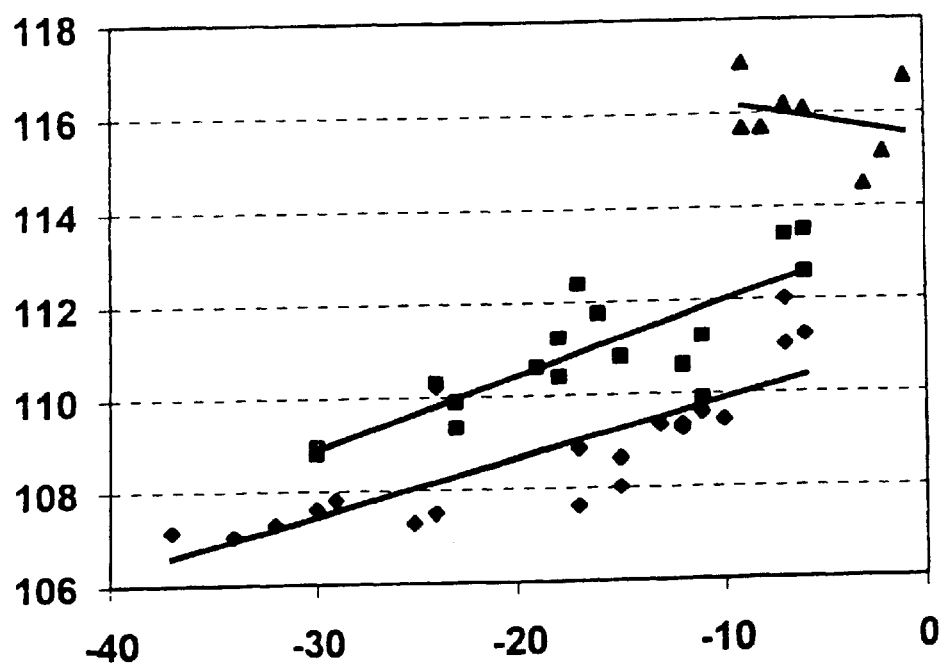
FIG. 10 is a graph of VI versus Pour Point (° C.) for three feeds for Catlayst E.

The VI as a function of pour point for the conversion of the three feeds over Catalyst C and Catalyst E are shown graphically in FIGS. 9 and 10, respectively. In both FIGS. 9 and 10 solid diamonds represent Feed-0, solid squares represent Feed-10, and solid triangles represent Feed-25.

It may be seen that the combination of pre-isomerization using the specified class of acidic isomerization catalyst followed by catalytic dewaxing leads to significantly higher VI's than for catalytic dewaxing alone. This remains true for process sequences which include separation of the vapor products from the liquid products before catalytic dewaxing as well as for process sequences which catalytically dewax the entire product from the isomerization reaction step.

What is claimed is:

1. A process for producing a lubricating base oil having good low temperature properties comprises:
   (a) contacting a hydrocarbon feedstock with an amorphous silica-alumina based isomerization catalyst having a pore volume less than 0.99 ml/gm ($H_2O$), an alumina content in the range of 35–55 wt % based on silica-alumina and an isoelectric point in the range of 4.5 to 6.5, and a metal hydrogenation component in the presence of hydrogen to at least partially isomerize waxy paraffins in the hydrocarbon feedstock, forming at least a partially isomerized feedstock; and
   (b) contacting at least a portion of the at least partially isomerized feedstock with a 10 or 12 ring shape selective crystalline molecular sieve catalyst containing a metal hydrogenation component in the presence of hydrogen to at least partially catalytically dewax the feedstock from step (a).

2. A process for producing a lubricating base oil having good low temperature properties comprises:
   (a) contacting a hydrocarbon feedstock with an amorphous silica-alumina based isomerization catalyst having a pore volume less than 0.99 ml/gm ($H_2O$), an alumina content in the range of 35–55 wt % based on silica-alumina wherein the silica-alumina is modified with a rare earth oxide or yttria or boria or magnesia and has an isoelectric point greater than but no more than 2 points greater than that of the base silica-alumina, and a metal hydrogenation component in the presence of hydrogen to at least partially isomerize waxy paraffins in the hydrocarbon feedstock, forming at least a partially isomerized feedstock; and
   (b) contacting at least a portion of the at least partially isomerized feedstock with a 10 or 12 ring shape selective crystalline molecular sieve catalyst containing a metal hydrogenation component in the presence of hydrogen to at least partially catalytically dewax the feedstock from step (a).

3. The process of claims 1 or 2 wherein the at least partially isomerized feedstock is stripped of gaseous components prior to step (b).

4. The process of claims 1 or 2 wherein the crystalline molecular sieve is a metallo silicate or metallo phosphate.

5. The process of claim 4 wherein the crystalline molecular sieve is a crystalline alumino silicate or crystalline silicoalumino phosphate.

6. The process of claim 5 wherein the alumino silicate is ZSM-5, ZSM-11, ZSM-22, ZSM-23, ZSM-35, ZSM-48, natural or synthetic ferrierites, mordenite and offretite or ZSM-57.

7. The process of claim 5 wherein the crystalline molecular sieve is SAPO-11, SAPO-41, SAPO-31, MAPO-11 or MAPO-31.

8. The process of claim 5 wherein the crystalline molecular sieve is ZSM-5, ZSM-22, ZSM-23, ferrierites or SAPO-11.

9. The process of claims 1 or 2 further comprising hydrofinishing the at least partially catalytically dewaxed feedstock.

10. The process of claims 1 or 2 wherein the catalyst of step (b) further comprises an amorphous component.

11. The process of claims 1 or 2 wherein the amorphous component has an acidity defined by the Kramer/McVicker scale of from 0.5–2.5.

12. The process of claims 1 or 2 further comprising extracting the at least partially catalytically dewaxed feedstock.

* * * * *